United States Patent [19]
Sano et al.

[11] Patent Number: 6,023,533
[45] Date of Patent: Feb. 8, 2000

[54] SYSTEM AND METHOD FOR CORRECTING GRAY SCALE IN AN IMAGING APPARATUS

[75] Inventors: Toshiyuki Sano, Yokohama; Keiji Toyoda, Hamamatsu, both of Japan

[73] Assignee: Matsushita Electric Industrial Co., Ltd., Osaka, Japan

[21] Appl. No.: 09/042,626

[22] Filed: Mar. 17, 1998

[30] Foreign Application Priority Data

Mar. 17, 1997 [JP] Japan ................................. 9-082418

[51] Int. Cl.⁷ ........................ G06T 5/00; G06T 5/40; H04N 1/40; H04N 1/407; H04N 5/202
[52] U.S. Cl. ..................... 382/274; 382/168; 358/455; 358/522; 348/254
[58] Field of Search ................................ 382/274, 254, 382/171, 168; 358/455, 522; 348/222, 234, 254

[56] References Cited

U.S. PATENT DOCUMENTS

| | | |
|---|---|---|
| 5,517,333 | 5/1996 | Tamura et al. . |
| 5,715,377 | 2/1998 | Fukushima et al. . |

FOREIGN PATENT DOCUMENTS

| | | |
|---|---|---|
| 0 534 430 | 3/1993 | European Pat. Off. . |
| 0534430 | 3/1993 | European Pat. Off. . |
| 0 712 093 | 5/1996 | European Pat. Off. . |
| 0712093 | 5/1996 | European Pat. Off. . |
| 61-57759 | 4/1986 | Japan . |
| 5066751 | 3/1993 | Japan . |
| 05103256 | 4/1993 | Japan . |
| 6141299 | 5/1994 | Japan . |
| 06189182 | 7/1994 | Japan . |
| 06189183 | 7/1994 | Japan . |
| 09037145 | 2/1997 | Japan . |
| 09149317 | 6/1997 | Japan . |

*Primary Examiner*—Scott Rogers
*Attorney, Agent, or Firm*—Lowe Hauptman Gopstein Gilman & Berner

[57] ABSTRACT

An input image is divided into relatively small blocks of pixels. Border data defining the areas are periodically calculated. For each pixel, a pair of selection pulses indicative of the area where the pixel is located is generated. In response to the pair of pulses, the gray scale characteristic is calculated for each area. The gray scale of the input image is corrected using one of the gray scale characteristic associated with each area to providing a corrected image signal for the area. In response to the pair of pulses, the corrected image signals are combined into an output image signal. An optimal gray scale correction is made for each area. The selection pulses are configured to gradually change near the borders thereby making the reproduced image appear natural.

19 Claims, 5 Drawing Sheets

LUMINANCE FLAGS

| 0 | 0 | 0 | 0 | 1 | 1 | 1 | 1 |
|---|---|---|---|---|---|---|---|
| 0 | 0 | 0 | 0 | 1 | 1 | 1 | 1 |
| 0 | 0 | 0 | 0 | 1 | 1 | 1 | 1 |
| 0 | 0 | 0 | 0 | 0 | 0 | 0 | 0 |
| 0 | 0 | 0 | 0 | 0 | 0 | 0 | 0 |
| 0 | 0 | 0 | 0 | 0 | 0 | 0 | 0 |

SMOOTHING FILTER

| 1/3 | 1/3 | 1/3 |
|---|---|---|
| 1/3 | 1/3 | 1/3 |
| 1/3 | 1/3 | 1/3 |

— 800

SYSTEM AND METHOD FOR CORRECTING GRAY SCALE IN AN IMAGING APPARATUS

BACKGROUND OF THE INVENTION

1. Field of the Invention

The invention generally relates to a gray scale correcting system in an imaging apparatus such as a video camera and, more particularly, to a system and a method for making a gray scale correction by using respective optimal gray scale characteristics for the areas into which an image is divided in response to the condition of the image.

2. Description of the Prior Art

The gray scale correction system of an imaging apparatus corrects an image signal to cause luminances of a reproduced image to match those of the subject to be shot. Various devises have been made to the gray scale correction system to effectively use an imaging system with a narrow dynamic range.

However, in conventional gray scale correcting systems, the positions of borders between the areas to which respective gray scale characteristics are applied are fixed. If both of low and high luminance portions exist in such an area, then this will cause an effective gray scale correction to be difficult. In this case, it would be very advantageous to be able to change the configuration of areas such that portions of largely different luminances do not exist in one area.

Thus a need exists in the art for a gray scale correcting system and method which periodically determines the borders defining areas into which an image is divided in response to the conditions of the image such that optimal gray scale characteristic can be applied to each of the areas.

SUMMARY OF THE INVENTION

The present invention provide a system and method for correcting gray scale of an input image using a gray scale characteristics for each of the areas into which the image is periodically redivided in response to the conditions of the image in an imaging apparatus. The input image is divided into M×N blocks of pixels (M=8 and N=6 in an illustrative embodiment). On the basis of the conditions of the input image, border data defining the areas are periodically calculated. For each pixel, a pair of selection pulses indicative of one of the areas where the pixel is located is generated. In response to the pair of pulses, the gray scale characteristic is calculated on the basis of histogram data obtained from each of the areas. For each of the areas, the gray scale of the input image is corrected using one of the gray scale characteristic associated with the area to provide a corrected image signal for the area. In response to the pair of pulses, the corrected image signals are combined into an output image signal. An optimal gray scale correction is made for each area.

The selection pulses are configured to gradually change near the borders thereby making the reproduced image appear natural.

If a high luminance block distribution is contiguous to one of four sides of the image, the image is divided into four areas such that one of the four areas includes the high luminance block distribution. If a high luminance block distribution is encircled by the other portion of said image, the image is divided into a center area and an area surrounding the center area such that the center area includes the high luminance block distribution.

BRIEF DESCRIPTION OF THE DRAWING

Further objects and advantages of the present invention will be apparent from the following description of the preferred embodiments of the invention as illustrated in the accompanying drawing, in which.

Throughout the drawing, the same elements when shown in more than one figure are designated by the same reference numerals.

DETAILED DESCRIPTION OF THE PREFERRED EMBODIMENTS

Figure 1:
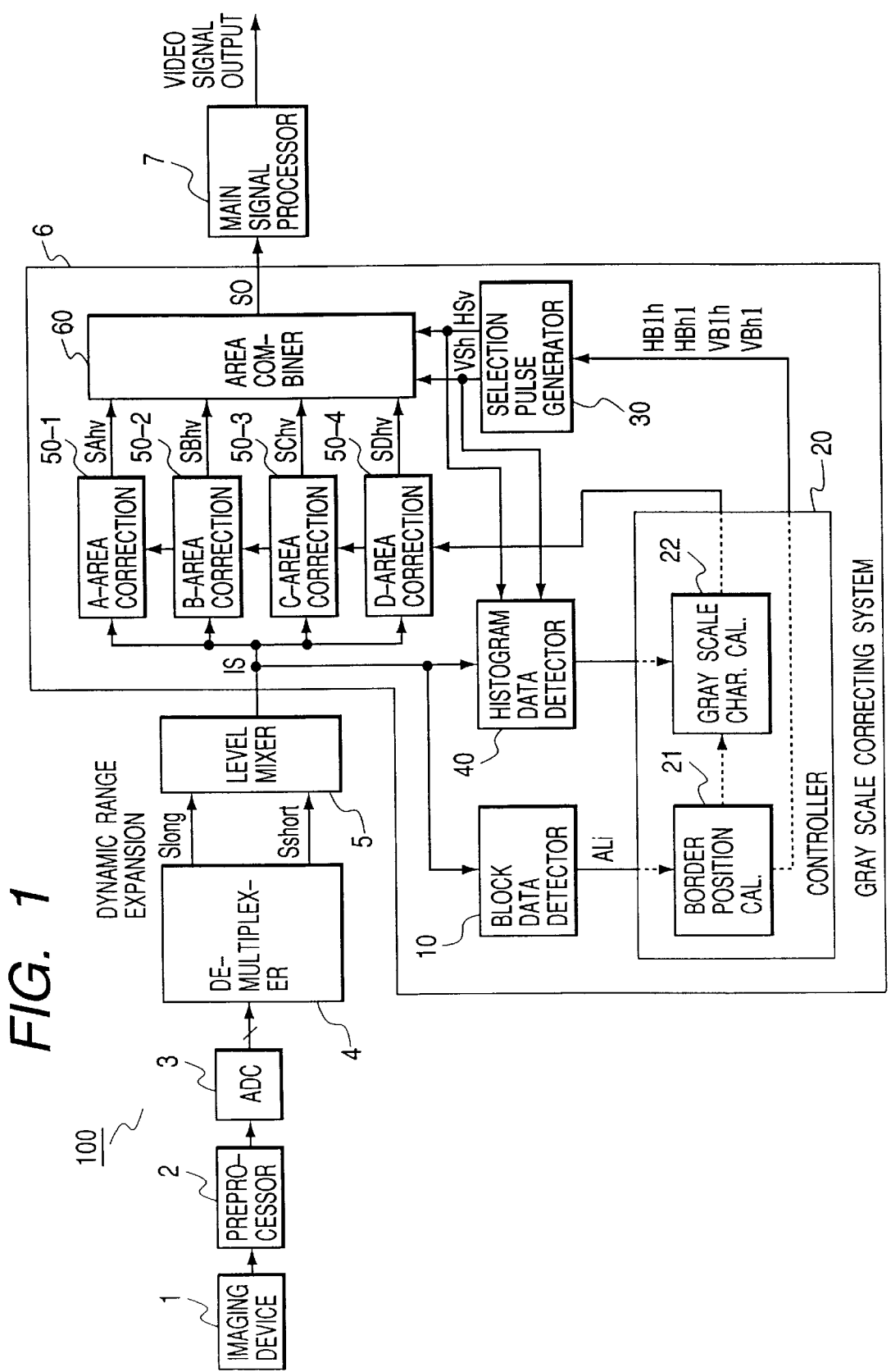
FIG. 1 is a block diagram showing an arrangement of a solid state imaging apparatus that incorporates a gray scale correcting system in accordance with an illustrative embodiment of the invention.

FIG. 1 is a block diagram showing an arrangement of a solid state imaging apparatus 100 that incorporates a gray scale correcting system in accordance with an illustrative embodiment of the invention. In FIG. 1, the imaging apparatus 100 comprises:

an imaging device 1 which is configured to alternately output two image signals (Sl and Ss) of different exposure times during each field;

a preprocessor 2 having its input connected to the imaging device 1 output;

an A/D (analog to digital) converter (ADC) 3 having its input connected to the preprocessor 2 output;

a demultiplexer 4 having its input connected to an ADC 3 output;

a level mixer 5 having its dual inputs connected to Slong and Sshort outputs of demultiplexer 4;

a gray scale correcting system 6 having its input connected to an output of a level mixer 5; and a main signal processor 7 which has its input connected to an output of a gray scale correcting system 6 and provides a video output signal as an imaging apparatus 100 output.

In this imagine apparatus 100, the imaging device 1 outputs the above mentioned image signals Sl and Ss in a time-division multiplexed manner. The signals Sl and Ss are subjected to a CDS (correlated double sampling), an AGC (automatic gain control), etc. by the preprocessor 2, are converted into digital signals by the ADC 3, and are demultiplexed into synchronized digital image signals Slong and Sshort, which are weighted and then mixed into a single digital image signal IS. The image signal IS is gray scale corrected by the inventive gray scale correcting system 6 as described in great detail later. The gray scale corrected image signal is processed by the main signal processor 7 thereby yielding a video signal output.

The gray scale correcting system 6 comprises:

a block data detector 10 having its input connected to the level mixer 5 output IS for dividing the image signal IS into M×N blocks of pixels (M and N are natural numbers) and outputting an average luminance ALi taken for each block $B_{m,n}$, where i=1, 2, . . . , M×N;

a controller 20 having a data path from the block data detector 10 for controlling the entire imaging apparatus 100;

a selection pulse generator 30 having a data path from the controller 20 for outputting vertical and horizontal selection pulses VSh and HSv, where h=1, 2, ..., H and v=1, 2, ..., V, where H and V are the numbers of horizontal and vertical pixels, respectively;

a histogram data detector 40 having its three inputs connected to the level mixer 5 output IS and selection pulse generator 30 VSh and HSv outputs and having a data path to the controller 20;

four gray scale correction circuits 50 having their respective inputs connected to the level mixer 5 output IS; and an area combiner 60 having its four corrected image inputs connected to outputs Sa, Sb, Sc and Sd of corresponding gray scale correction circuits 50, having its area selection inputs connected to outputs VSh of selection pulse generator 30 and HSh and having its output, S0, as the output of the gray scale correcting system 6, connected to the main signal processor 7 input.

It should be noted that the lines linking elements do not necessarily correspond to electrically conductive wires but may show data flow. It is especially true of the lines connected to the controller 20. The lines shown as connected to the controller 20 may be preferably realized as data bus connected to a central processing unit (not shown) included in the controller 20.

The controller 20 may be any suitable microcomputer which is well known in the art. The rest of the system 6 other than the controller 20 may be realized as an IC. It may be preferable to include the demultiplexer 4 and the level mixer 5 in the IC.

It is also noted that a border position calculation function 21 and the gray scale characteristic calculation function 22 shown in the controller 20 are not hardware but software realized by respective programs stored in read only memory (not shown).

Figures 2, 3:
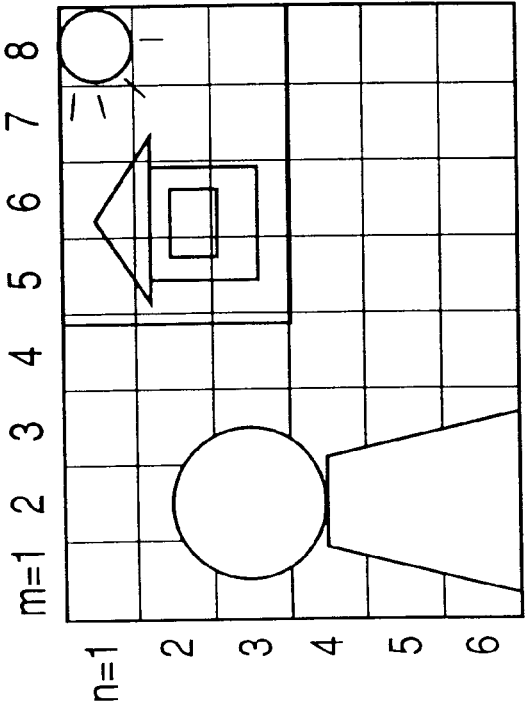
FIG. 2 shows an example of an input image which has been divided into 8×6 blocks.
FIG. 3 shows average luminance values calculated for the blocks.

As described above, an input image is divided into M×N blocks which are much smaller than the average area of the areas considered in the gray scale correction. In this specific embodiment, M and N are assumed to be 8 and 6, respectively. An example of an input image which has been divided into 8×6 (=48) blocks is shown in FIG. 2.

According to the illustrative embodiment of the invention, a gray scale characteristic calculation cycle needs several fields, e.g., 5 fields in the most effective case. Specifically, the first field of the cycle is used for the determination of the borders that defines the areas, i.e., the calculation of the border positions as detailed later. The remaining four fields of the gray scale characteristic calculation cycle are used for four gray scale characteristic calculations for four areas on the basis of four sets of histogram data for four areas each of which sets are collected taking a field of time. The gray scale characteristics are used for correction in the first field of the next cycle.

Operation in the first field of the cycle

The block data detector 10 calculates an average ALi of luminances of the pixels in each block $B_{m,n}$ (i=1, 2, ..., 48 in this example), i.e., average luminances AL1, AL2, ..., AL48 (M×N=8×6). FIG. 3 shows average luminances {ALi|i=1, 2, ..., 48} calculated for the image of FIG. 2. The calculated luminances are passed to the controller 20. The controller 20 executes the border position calculation function 21 (as will be detailed later) to generate horizontal and vertical border data HB1h(n), HBh1(n), VB1h(m) and VBh1(m), where n=1, 2 ..., (N−1) and m=1, 2 ..., (M−1).

Figure 4:
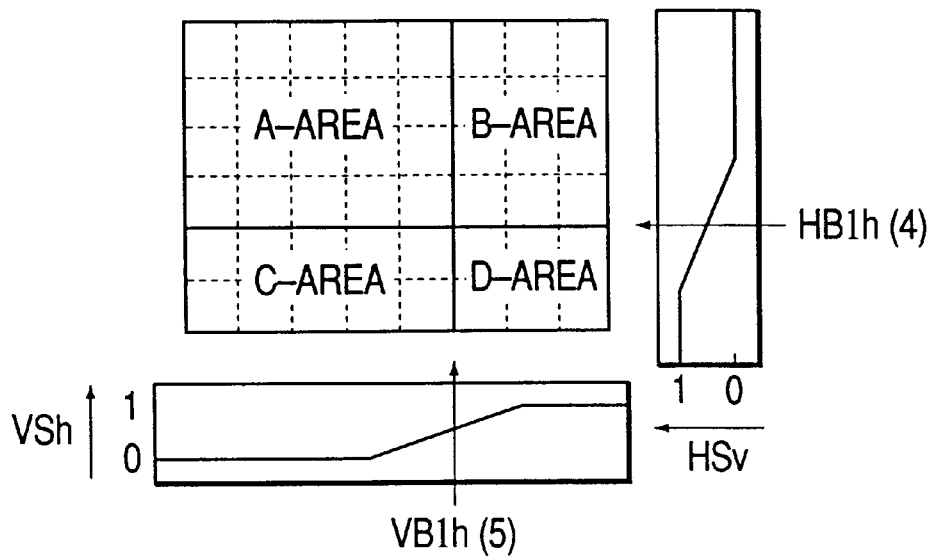
FIGS. 4 and 5 are diagrams illustrating selection pulses generated in case of 2-and 4-area divisions, respectively.
Figure 5:
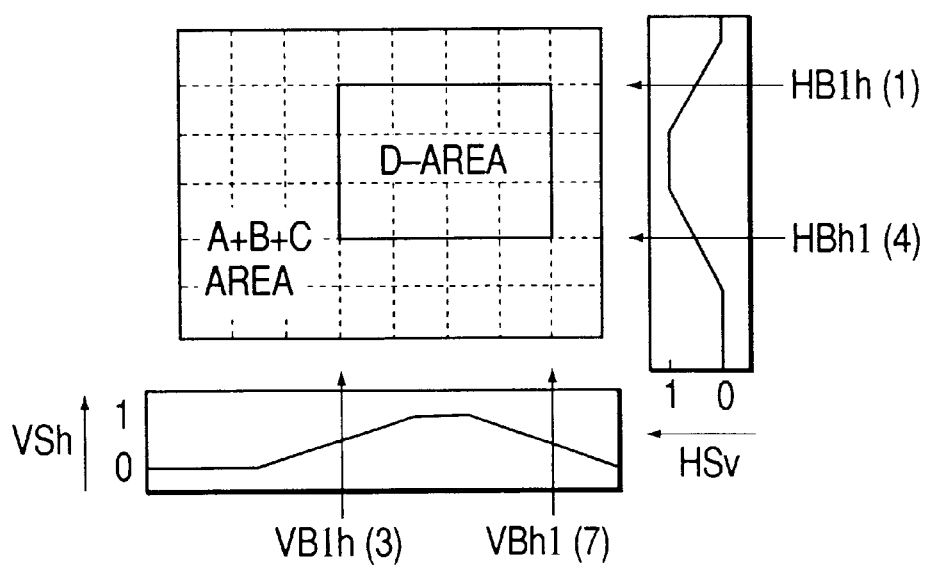

The border data is data to indicate a change of luminance along the scanning direction, i.e., the position and the direction (rise or fall) of a luminance change. Specifically, the horizontal border data HB1h(n) and HBh1(n) indicates horizontal border lines between blocks $B_{m,n}$ and $B_{m,n+1}$ where the luminance changes from low to high and from high to low, respectively, as scanned from left to right. The vertical border data VB1h(m) and VBh1(m) indicates vertical border lines between blocks $B_{m,n}$ and $B_{m+1,n}$ where the luminance changes from low to high and from high to low as scanned from top to bottom. For example, in FIG. 4, the image is divided into 4 areas by a horizontal border HB1h(4) which means that the luminance changes low to high between blocks $B_{m,4}$ and $B_{m,5}$ when observed from top to bottom and a vertical border VB1h(5) which means that the luminance changes low to high between blocks $B_{5,n}$ and $B_{6,n}$ when observed from left to right. Thus, it is seen that the D-area has a high luminance. Similarly, FIG. 5 shows an example of a division into two areas in which one (D area) is encircled by the other area, i.e., A+B+C area.

Figure 6:
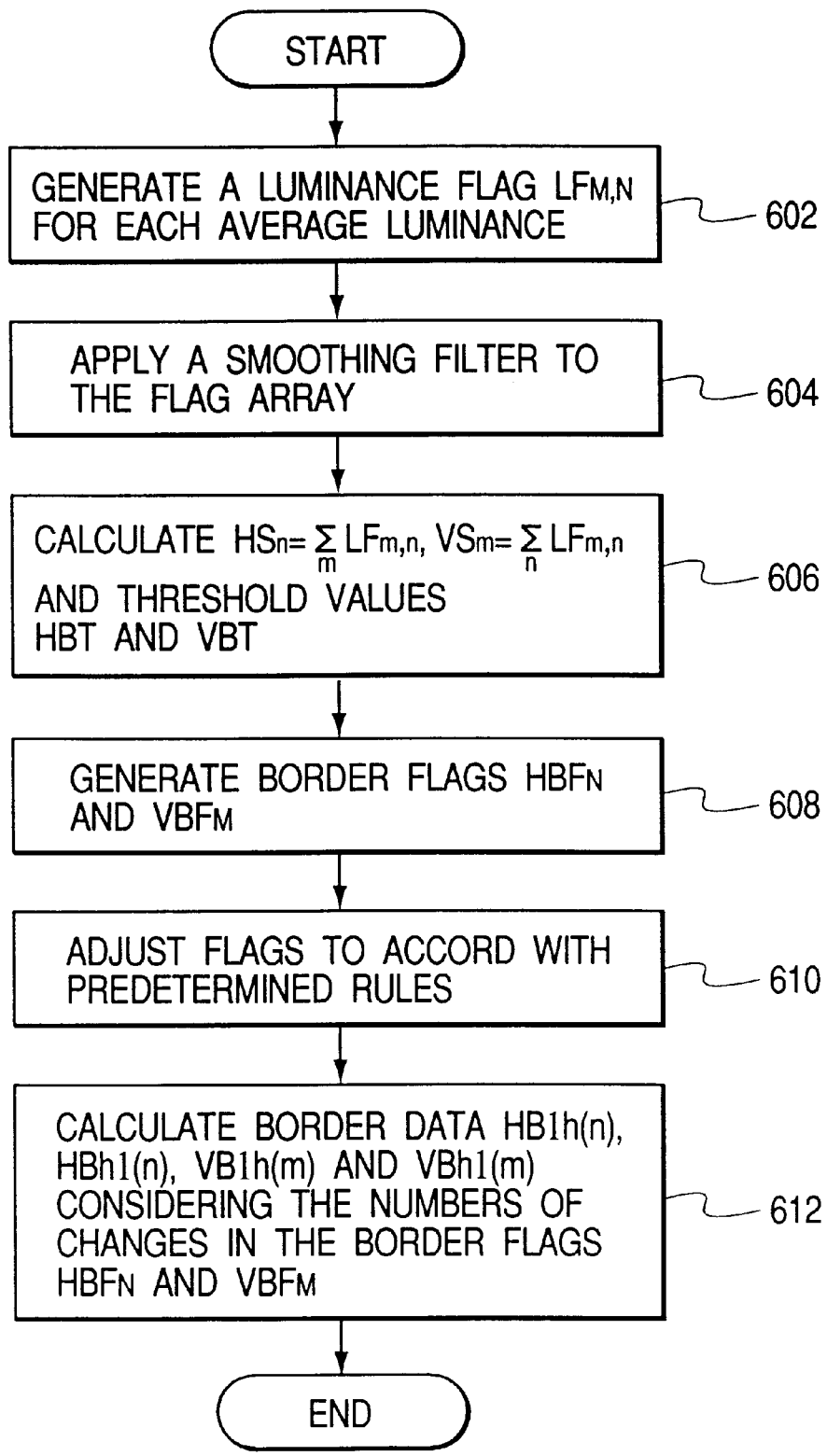
FIG. 6 is a flow chart showing the operation of a border position calculation function of the controller of FIG. 1.

FIG. 6 shows the operation of border position calculation function 21 of the controller of FIG. 1 which is invoked when the average luminances AL1, AL2, ..., AL48 are received from the block data detector 10. In FIG. 6, the controller 20 compares each average luminance ALi with a predetermined reference value Lr and generates a luminance flag $LF_{m,n}$ for each average luminance by setting the flag to 1 if the average luminance is larger than the reference value Lr (step 602). Thus generated array of luminance flags is shown in FIG 7.

Figures 7, 8, 9:
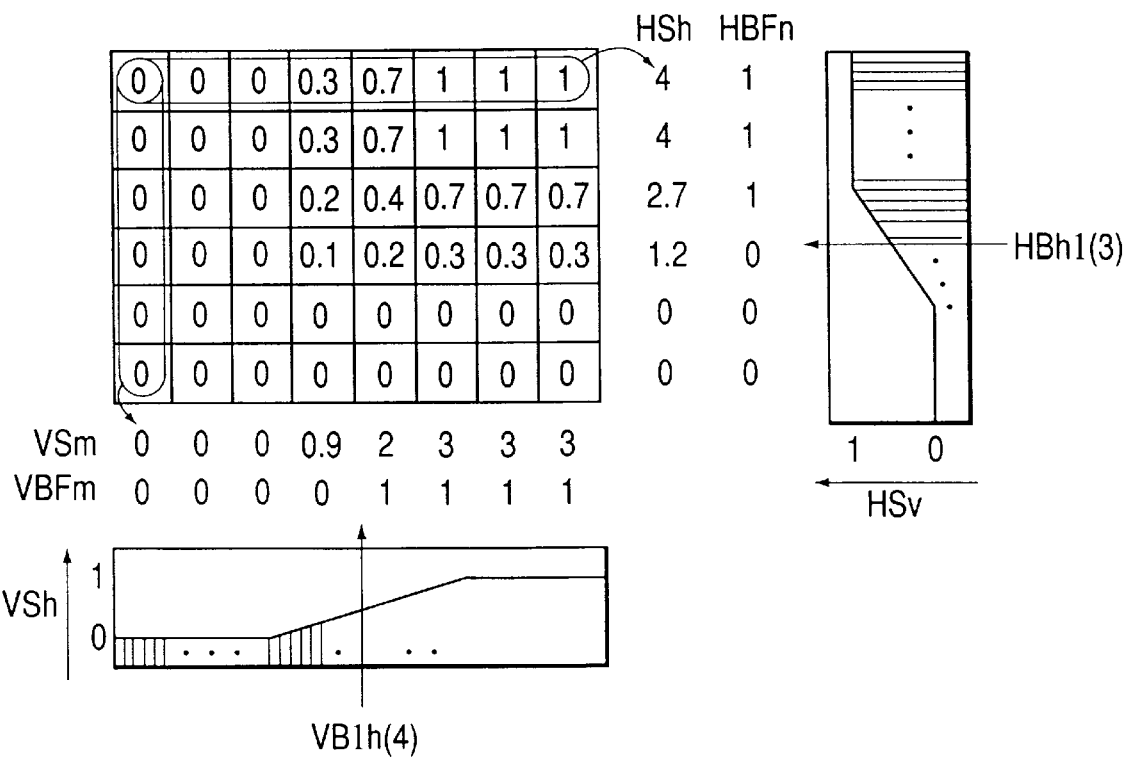
FIG. 7 shows luminance flags $LF_{m,n}$ calculated for the blocks.
FIG. 8 shows an example of a smoothing filter.
FIG. 9 shows calculation of border flags $HBFn$ and $VBFm$ and border positions data.

In step 604, the controller 20 passes the luminance flag array through a smoothing filter 800 of FIG. 8. The filter 800 is a 3×3 array of values of ⅓. It is noted that in order to avoid data loss in the outermost blocks $B_{m,n}$ for m=1 and 8 and n=1 and 6 caused when the filter is applied to the luminance flag array as it is, the outermost blocks of the array are expanded outside in a well known manner before passing through the smoothing filter 800. An array of the filtered luminance flags is shown in FIG. 9.

In step 606, the controller 20 calculates horizontal and vertical sums HSn and VSm as follows:

$$HSn = \sum_m LF_{m,n},$$

$$VSm = \sum_n LF_{m,n},$$

and further calculates horizontal and vertical border thresholds HBT and VBT as follows:

HBT=(1/N)ΣHSn,

VBT=(1/M)ΣHSm.

In case of the filtered luminance flag array of FIG. 9, the calculation of the horizontal and vertical sums yields HSn= 4, 4, 2.7, 1.2, 0, 0 and VSm=0, 0, 0, 1, 2, 3, 3, 3. Therefore, calculating the horizontal and vertical border thresholds, we obtain HBT=11.9/6≈2 and VBT=11.9/8≈1.5.

In step 608, the controller 20 compares each horizontal sum HSn with the horizontal border threshold value HBT (=2) and each vertical sum VSm with the vertical border threshold value VBT (=1.5) to generate horizontal border flags HBFn and vertical border flags VBFm by setting the flag to 1 if the sum exceeds the threshold value. By doing this again in FIG. 9, we obtain horizontal border flags HBFn=1, 1, 1, 0, 0, 0 and vertical border flags VBFm=0, 0, 0, 0, 1, 1, 1, 1. Through this operation, the flags for block lines which contains many high luminance blocks will be set to 1.

On the basis of the obtained horizontal and vertical border flags, above mentioned border position data is generated. However, if a too small area is subjected to a gray scale correction with characteristic(s) different from the peripheries, this will make the reproduced image appear unnatural. In order to avoid this situation, the controller 20 makes a test to see if there are any blocks which do not accord with a predetermined rule. If any, the controller 20 inverts the flags of the found blocks in step 610.

In step 612, the controller 20 calculates border position data HBlh(n), HBhl(n), VBlh(m) and VBhl(m) considering the numbers of changes in the border flags HBFn and VBFm. Specifically, the image is (1) divided into four areas, if both of the horizontal and vertical border flags HBFn and VBFm change only once when scanned, or if only border flag group HBFn or VBFm changes two or less times; and (2) divided into two areas if both of the horizontal and vertical border flags HBFn and VBFm change twice when scanned.

This is because only one change in both flag groups or two or less change in only one flag group means that a high luminance block distribution is contiguous to one of the four sides of the image, in which dividing the image into four areas leads to an effective gray scale correction. Also, two changes in both flag groups means that a high luminance block distribution is encircled by the other portion, in which dividing the image into two blocks rather than four blocks yields a more natural gray scale correction.

It is also noted that if there are more than three changes in either flag group, the image is divided into four areas by setting the horizontal and vertical border positions at the horizontal and vertical centers.

In this way, the controller 20 generates and sends border position data HB1h(n), HBh1(n), VB1h(m) and VBh1(m) to the selection pulse generator 30, and ends the operation of the function 21. Thus, the image is divided into two or four appropriate areas in response to the conditions of the image prior to a gray scale correction, thereby enabling an optimal gray scale correction.

Operation in the subsequent four fields of the gray scale characteristic calculation cycle On receiving the border position data, in each of the four fields, the selection pulse generator 30 generates vertical and horizontal selection pulses VSh and HSv, where $0 \leq VSh \leq 1$, $0 \leq HSv \leq 1$, h=1, 2, ..., H, and v=1, 2, ..., V, where H and V are the numbers of horizontal and vertical pixels, respectively. As shown as VSh and HSv in FIG. 9, the selection pulses VSh gradually change from 0 to 1 near the border line defined by VB1h(4), i.e., near the boundary between blocks $B_{4,n}$ and $B_{5,n}$, and the selection pulses HSv gradually change from 1 to 0 near the border line defined by HBh1(3). The selection pulses VSh and HSv are supplied to the histogram data generator 40 and the area combiner 60.

In each of the four fields, the histogram data generator 40 detects histogram data from different ones of the areas of the image IS in response to the selection pulses VSh and HSv from the selection pulse generator 30. During the four fields of time, the detected histogram data for four areas are passed to the controller 20, which in turn calculates an optimal gray scale characteristic for one of the four areas in each field. The calculated gray scale characteristic for each area is passed to one of the A-area, B-area, C-area and D-area correction circuits 50 in the stated order.

In the first field of the next cycle

The gray scale correction circuits 50 correct the gray scale of the image IS so as to realize the respective gray scale characteristic to provide gray scale-corrected image signals SAhv, SBhv, SChv and SDhv, which are passed to the area combiner 60. Then, the area combiner 60 combines the received image signals SAhv, SBhv, SChv and SDhv into an output signal SO. In case of a division into 4 areas, the combining operation is performed in accordance with the following expression.

$$SO=(1-HSv)\cdot(1-VSh)\cdot SAhv+HSv\cdot(1-VSh)\cdot SBhv+(1-HSv)\cdot VSh\cdot SChv+HSv\cdot VSh\cdot SDhv. \quad (1)$$

High luminance blocks may sometimes gather in a central part of the image. In such a case, the image is divided into a central D-area and a surrounding A+B+C-area corresponding to a combination of A, B, and C areas as shown in FIG. 5. On the basis of the two areas, gray scale characteristics for the two areas (A+B+C) and D are calculated. In this case, the characteristic for the D-area is supplied to the D-area correction circuit, and the characteristic for the A+B+C-area is supplied to the A-area, B-area and C-area correction circuits. The four gray scale correction circuits 50 operate in the same way as in case of the division into four areas to provide gray scale corrected image signals SAhv, SBhv, SChv and SDhv, which are combined into an output image signal SO by the area combiner 60. Since the circuits 50-1 through 50-3 are supplied with the same gray scale characteristic, the signals SAhv, SBhv and SChv are identical to one another. For this reason, assuming that SAhv=SBhv=SChv=S'hv, the equation (1) can be rewritten as follows:

$$SO=(1-HSv)\cdot(1-VSh)\cdot S'hv+HSv\cdot(1-VSh)\cdot S'hv+(1-HSv)\cdot VSh\cdot S'hv+HSv\cdot VSh\cdot SDhv. \quad (2)$$

In either case, gradually changing selection pulses in the neighborhood of each border advantageously causes the borders to be smooth.

Many widely different embodiments of the present invention may be constructed without departing from the spirit and scope of the present invention. It should be understood that the present invention is not limited to the specific embodiments described in the specification, except as defined in the appended claims.

What is claimed is:

1. A system for correcting gray scale of an input image using a gray scale characteristic for each of a plurality of areas into which the image is periodically redivided in response to the conditions of image in an imaging apparatus, the system comprising:

means operative on the basis of conditions of said input image for periodically calculating border data defining said areas, each of said areas comprising blocks of pixels;

means for generating, for each pixel, a pair of pulses indicative of one of said areas where said pixel is located;

means responsive to said pair of pulses for calculating said gray scale characteristic on the basis of histogram data obtained from said one of said areas;

means assigned to each of said areas for correcting the gray scale of said input image using said gray scale characteristic associated with the area to provide a corrected image signal for the area; and means responsive to said pair of pulses for combining said corrected image signals into an output image signal.

2. A system as defined in claim 1, wherein said means for generating a pair of pulses comprises:

means operative when either of said pulses is in the neighborhood of a border defined by said border data for gradually changing a magnitude of said either of said pulses.

3. A system as defined in claim 1, wherein said means for periodically calculating border data comprises:

means operative when a high luminance block distribution is contiguous to one of four sides of said image for making said areas comprise four areas such that one of said four areas includes said high luminance block distribution; and means operative when a high luminance block distribution is encircled by the other portion of said image for making said areas comprise a center area and an area surrounding said center area such that said center area includes said high luminance block distribution.

4. A method for correcting gray scale of an input image using a gray scale characteristic for each of a plurality of areas into which the image is periodically redivided in response to conditions of the image in an imaging apparatus, the method comprising the steps of:

on the basis of conditions of said input image, periodically calculating border data defining said areas, each of said areas comprising blocks of pixels;

generating, for each pixel, a pair of pulses indicative of one of said areas where said pixel is located;

in response to said pair of pulses, calculating said gray scale characteristic on the basis of histogram data obtained from said one of said areas;

for each of said areas, correcting the gray scale of said input image using said gray scale characteristic associated with the area to provide a corrected image signal for the area; and in response to said pair of pulses, combining said corrected image signals into an output image signal.

5. A method as defined in claim 4, wherein said step of generating a pair of pulses comprises the step of:

when either of said pulses is in the neighborhood of a border defined by said border data, gradually changing a magnitude of said either of said pulses.

6. A method as defined in claim 4, wherein said step of periodically calculating border data comprises the steps of:

when a high luminance block distribution is contiguous to one of four sides of said image, making said areas comprise four areas such that one of said four areas includes said high luminance block distribution; and when a high luminance block distribution is encircled by the other portion of said image, making said areas comprise a center area and an area surrounding said center area such that said center area includes said high luminance block distribution.

7. An imaging apparatus comprising:

an imaging device which outputs a long exposed image signal and a shortly exposed image signal;

a level mixer which mixes said long exposed image signal and said shortly exposed image signal in a single image signal;

a luminance level detector which detects a luminance level of a plurality of areas in said single image signal and outputs a luminance level value;

a border position calculator which calculates a border in said single image signal based on said luminance level value;

a gradation corrector which corrects gradation characteristics in each of a plurality of areas divided by said border; and an area combiner which combines said plurality of areas into one image signal.

8. An imaging apparatus according to claim 7, wherein said border position calculator periodically calculates a border in said single image signal to redivide said single image signal based on said luminance level value.

9. An imaging apparatus according to claim 7 further comprising:

an average luminance data detector which outputs an average luminance data for each of said plurality of areas; and wherein said border position calculator calculates said border based on said average luminance data.

10. An imaging apparatus according to claim 7 further comprising:

an average luminance data detector which outputs an average luminance data for each of said plurality of areas;

wherein said border position calculator calculates said border based on a distribution of high luminance area in accordance with said average luminance data.

11. An imaging apparatus according to claim 10, wherein said border position calculator calculates said border to divide said single image signal into four areas when a distribution of said high luminance area is in contact with one side of an image and to locate said high luminance area in one of said four areas.

12. An imaging apparatus according to claim 10, wherein said border position calculator calculates said border to divide said single image signal into at least two areas when a distribution of said high luminance area is not in contact with one side of an image and to locate said high luminance area in one of said two areas.

13. A video camera comprising:

an imaging device which outputs a long exposed image signal and a shortly exposed image signal;

a level mixer which mixes said long exposed image signal and said shortly exposed image signal in a single image signal;

a luminance level detector which detects a luminance level of a plurality of areas in said single image signal and outputs a luminance level value;

a border position calculator which calculates a border in said single image signal based on said luminance level value;

a gradation corrector which corrects gradation characteristics in each of a plurality of areas divided by said border; and an area combiner which combines said plurality of areas into one image signal.

14. A method of gradation correction of an image signal comprising steps of:

generating a long exposed image signal and a shortly exposed image signal;

synchronizing said long exposed image signal and said shortly exposed image signal in a single image signal;

detecting a luminance level of a plurality of areas in said single image signal;

calculating a border position in said single image signal based on a distribution of said luminance level;

correcting gradation characteristics in each of a plurality of areas divided by said border; and combining said plurality of areas into one image signal.

15. A method of gradation correction of an image signal according to claim 14, further comprising a step of:

detecting an average luminance data for each of said plurality of areas;

wherein said step of calculating a border position comprises calculating said border position based on said average luminance data.

16. A method of gradation correction of an image signal according to claim 14, further comprising a step of:

detecting an average luminance data for each of said plurality of areas;

wherein said step of calculating a border position comprises calculating said border position based on a distribution of high luminance areas in accordance with said average luminance data.

17. A method of gradation correction of an image signal according to claim 16, wherein said step of calculating a border position comprises calculating said border position to divide said single image signal into four areas when a distribution of said high luminance area is in contact with one side of an image; and said high luminance area is located in one of said four areas.

18. A method of gradation correction of an image signal according to claim 16, wherein said step of calculating a border position comprises calculating said border position to divide said single image signal into at least two areas when a distribution of said high luminance area is not in contact with one side of an image;

and said high luminance area is located in one of said two areas.

19. A method of gradation correction of an image signal according to claim 14, wherein said step of calculating a border position comprises periodically calculating a border in said single image signal and redividing said single image signal based on said luminance level.

* * * * *